Patented Mar. 16, 1937

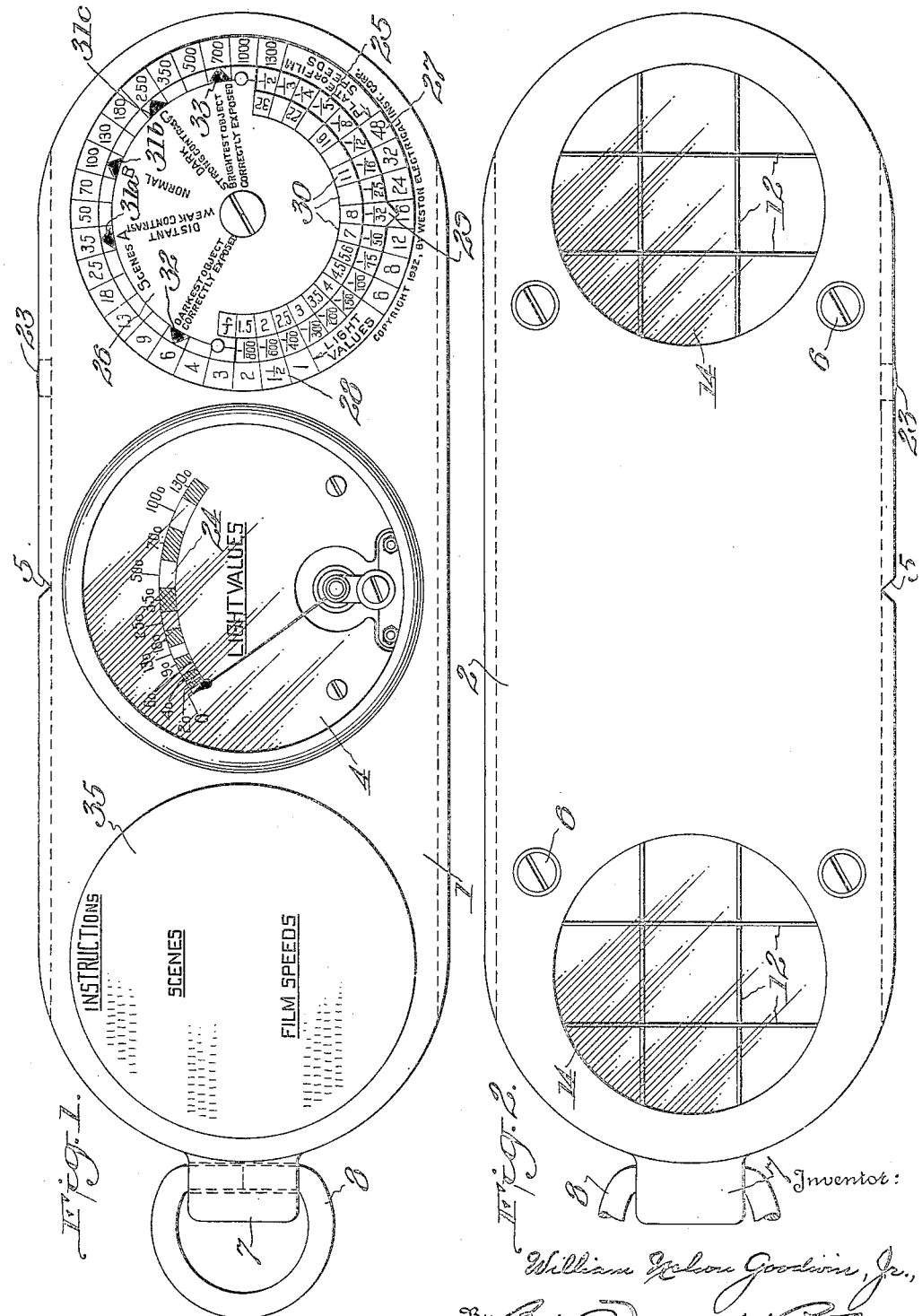

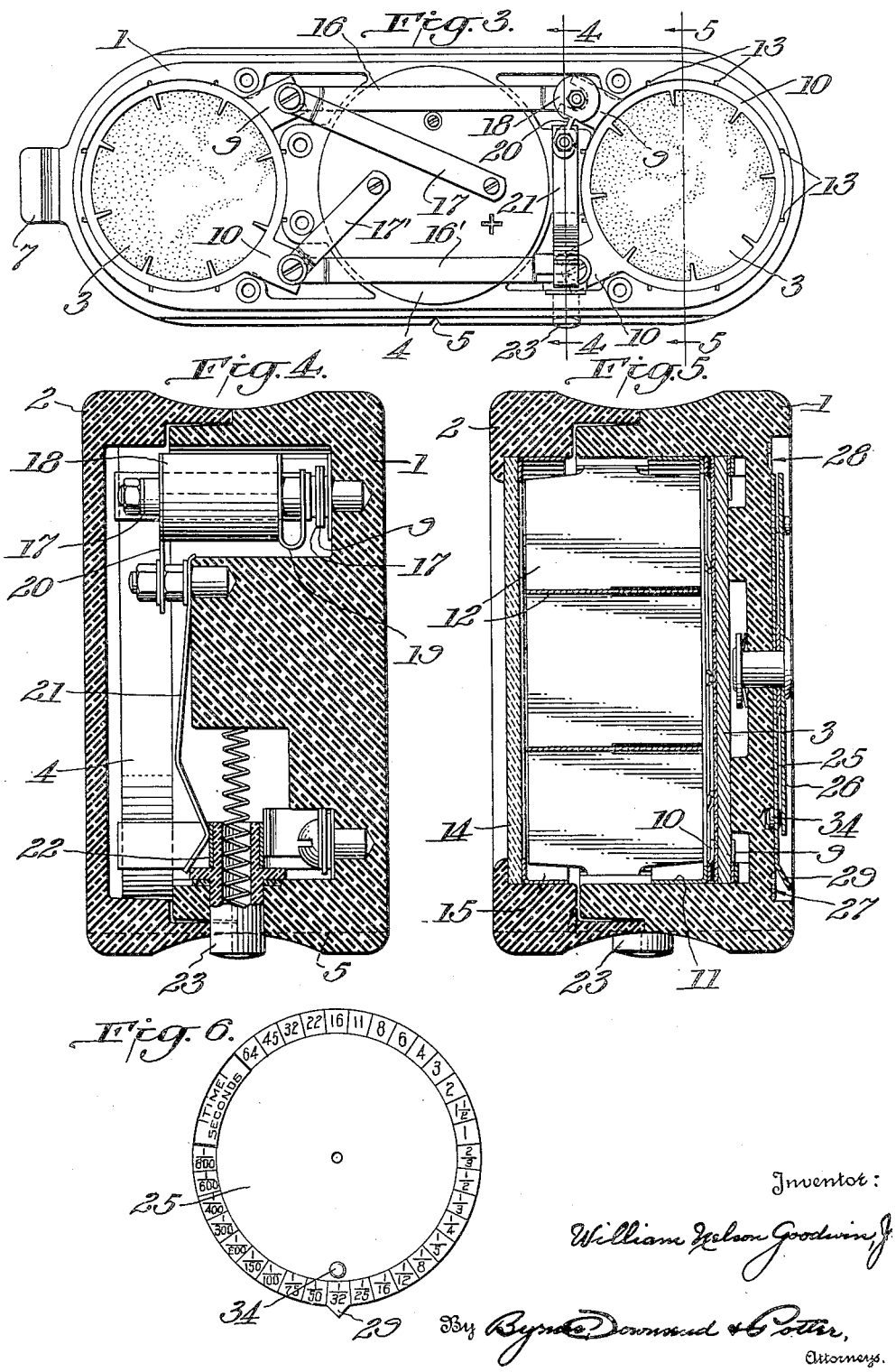

2,073,790

UNITED STATES PATENT OFFICE 2,073,790

PHOTOGRAPHIC EXPOSURE METER

William Nelson Goodwin, Jr., Newark, N. J., assignor to Weston Electrical Instrument Corporation, Newark, N. J., a corporation of New Jersey Application October 21, 1932, Serial No. 638,967

13 Claims. (Cl. 88—23)

This invention relates to apparatus for determining the proper exposure for photographic films or plates, and more particularly to apparatus including a meter for measuring the illumination at, or the brightness of the scene or object to be photographed, and a computing device for translating the measured light values into the proper diaphragm opening and shutter speed to give a correct exposure.

Since the only light rays which properly affect the film are those reflected to the film from, or emitted by, the object to be photographed, it will be apparent that the proper exposure cannot be determined by measuring the general illumination at the camera, as in the known methods which involve the exposure of sensitive paper to obtain a standard color density. Furthermore, many of the systems which involve a measurement of the average brilliancy of the object are open to the objection that no consideration is given to the nature of the scene to be photographed, and the proper exposure is not determined for the light and for the dark portions of the scene. Assume, for example, the picture is to include a red brick building and one adjacent building, and the adjacent buildings being a similar red brick building and a white stone building. It is obvious that the exposure which will give a good reproduction of the central building is not dependent upon the brightness of the remaining portion of the picture. Those known methods which are based on average brilliancy will, however, indicate different exposures for the combinations of two red buildings and of one red and one white building, since the light reflected from the white building will increase the average brightness, thus giving a false indication which may result in an underexposure of the important feature of the picture.

An object of the present invention is to provide a simple and efficient exposure meter for measuring the brightness of a view or object and for determining the exposure conditions from that measured value and the nature of that view. An object is to provide a computing device which, when set in accordance with the measured brightness and the nature of an object, will indicate not only the proper exposure but also the limits, as to light areas and dark areas, which will be properly reproduced by that exposure. An object is to provide a computing device of the type stated which when set for measured light value and the nature of the object, will indicate the lens aperture and shutter speed which will properly reproduce all tones of light values between the darkest portions and the lightest portions of an object having contrasting light and dark areas, or will give the best compromise in case the brightness range in the scene exceeds the film range.

An object is to provide a computing device and means for setting it to the brightness of the darkest object in the scene whereby if the lens aperture and shutter speed are set in accordance to its indications, all objects of greater brightness up to the limit of the film range will be correctly exposed. Also means for setting to the brightness of the brightest object in the scene, whereby all objects of lower brightness will be correctly exposed down to the lower limit of the film range, thus virtually doubling the meter range.

These and other objects and advantages of the invention will be apparent from the following specification, when taken with the accompanying drawings, in which, Figs. 1 and 2 are a front view and a rear view, respectively, of the exposure meter;

Fig. 3 is a rear view of the front section of the casing and of the parts mounted on the same;

Figs. 4 and 5 are transverse sections on lines 4—4 and 5—5, respectively, of Fig. 2 and Fig. 6 is a plan view of the time values disk of the computer.

In the drawings, the reference numerals 1, 2 identify the telescoped front and rear sections, respectively, of a light tight casing in which a pair of photoelectric cells 3 and a measuring instrument 4 are mounted. The top and bottom walls of the casing are grooved or dished for ease in handling and alined sighting notches 5 are formed in the upper edges of the casing sections to facilitate the directing of the exposure meter towards the center of the scene or object which is to be photographed. Screw 6 passes through the rear section and into the front section 1 to hold the sections in assembled position and a pair of grooved lugs 7 project from the sections at one end to receive a carrying handle 8.

As shown in Fig. 5, the photoelectric cells 3 are located at the rear face of the front section 1 which may be, and preferably is, formed of a molded synthetic resin which is a non-conductor, and the cells are retained in position and in contact with opposed terminal rings 9, 10 by flanged rings 11 which engage the walls of the recesses in which the cells are mounted.

The photoelectric cells are of the current generating type, and, as indicated, the terminal ring 9 contacts with the base plate and the ring 10 has fingers for contacting the light sensitive layer. Louvres for restricting the light reaching each cell to a cone of about 60° are formed by black surfaced plates 12 that are notched to cross each other, the edges of the plates being received in slots 13 in the walls of casing 1. Glass plates 14 are retained in openings in rear section 2 by rings 15, and close the casing against the entrance of dust and moisture.

The electrical connections include a strap 16 which joins the terminal rings 9 of the photoelectric cells and a strap 17 which extends to the positive terminal of the instrument. Similar straps 16', 17' connect the other terminal rings in parallel and to the other instrument terminal. The instrument is of the double range type and a shunt resistance 18 has one terminal 19 connected to a ring terminal 9 and strap 17, and its other terminal 20 connected to the spring contact 21 of a normally closed switch, the other contact 22 of the switch being connected to the opposite terminals 10 of the cells. When the spring-pressed push button 23 is depressed, the switch is opened as the internal flange of the button forces contact 21 away from the contact 22.

The shunt resistance 18 is preferably of such value that the opening of the shunt resistance circuit increases the instrument sensitivity by a 10 to 1 ratio, thus permitting the use of a single set of graduations for the instrument scale 24. With this arrangement, the last digit of each numeral value is preferably of smaller size than the remaining digits, as this form of numerals facilitates the dropping of the last zero, i. e., dividing the indicated numeral value by ten, when the lower range scale is to be read. The scale 24 is graduated in units of brightness, and preferably in absolute units such, for example, as candles per square foot, and it is to be noted that the scale is divided into blocks or units of contrasting colors, each block or unit carrying the numerical designation corresponding approximately to the center of that block. As indicated in Fig. 1, the scale range may be from 0 to 1300 candles per square foot with the shunt resistance in circuit and from 0 to 130 when the switch button is depressed to increase the sensitivity of the instrument.

Since factors additional to the measured light value have a controlling effect upon the exposure, a calculator is mounted on the front wall of the casing 1 to correlate the several factors of illumination, relative contrast between light and dark sections of the view, and plate speed into terms of diaphragm opening and shutter speed. The calculator is preferably of the rotating disc type and, as illustrated, includes two discs 25 and 26 which are pivotally supported for rotation relative to each other and to a fixed disc which may be, and preferably is, formed directly on the front wall of the casing and comprises the scale 27 of values of plate or film speeds (6, 8, 12, etc. which are arbitrary values but which have a definite ratio to each other, and scale 28 of light intensity (1, 1½, 2 candles per square foot). The next smaller disc 25 carries a scale of time values, in seconds and fractions of seconds, and also an index 29 for cooperation with the scale 27 of plate speeds. The outer disc 26 has a scale 30 graduated in diaphragm or stop openings (f 1.5, 2, etc.) and a series of pointers 31ª, 31ᵇ and 31ᶜ, corresponding to the types of scenes which are designated by the several legends "Scene A—Distant, weak contrast", "Scene B—Normal", and "Scene C—Dark, strong contrast", which appear on the disc 26 adjacent the respective pointers.

The values given on the discs of the calculator and their relative locations are based upon the fact that exposure on a plate or film is directly proportional to the brightness of the object photographed; to the time the light acts, and inversely proportional to the square of the so-called "f" number, which is the ratio of the focal length of the lens to the diameter of the diaphragm aperture. The numerical values on the scale increase logarithmically at such a rate that the effect upon the exposure increases by about $\sqrt{2}$ for each block or square, that is, the effect doubles at each second block.

Additional pointers or arrows 32, 33 are provided on the disc 26, and legends "Darkest object correctly exposed" and "Brightest object correctly exposed" appear adjacent the respective arrows. These arrows are particularly important as they provide a check upon the exposure which is determined when the computation is made upon a basis of the average brightness of the scene, and they also provide new methods of determining the exposure upon a basis of the darkest or the brightest objects in the scene.

All scenes consist of objects of varying brightness, and it is the proper reproduction of the light, the dark and the intervening tones which gives character to the photograph. Each particular light tone should act upon the sensitive photographic material to an amount corresponding to its brightness, but photographic films are of course limited in the range of light values which they can faithfully reproduce. As a general average among commercial films, the ratio of the brightest to the darkest object which will be correctly reproduced is about 128 to 1. The "exposure limits" arrows 32 and 33 are, therefore, so spaced apart, with respect to the graduations of the brightness scale 28, that the light value adjacent arrow 33 will be, for all settings of disc 26, about 128 times the light value indicated at pointer 32. It is fortunate that the contrast in most scenes which it is desired to photograph falls within this ratio but, if the ratio in any scene is greater, either the darkest objects will be underexposed or the lightest objects will be overexposed. The calculator thus enables the photographer to determine whether or not the exposure which is indicated by the average brightness of a particular scene will give a proper exposure for all light tones that are to be included and, in the case of very contrasting light tones, to determine that exposure which will properly reproduce those limiting values, either very dark or very bright, which are of greatest importance.

To compute the exposure in any case, the first factor to be set is that of the plate or film speed which is done by setting pointer 29 on dial 25 to the number corresponding to the film speed on scale 27. So long as the same type of film and the same kind of illumination source are employed, as for example, daylight or tungsten light, this factor remains constant, and the dial 25 need not be changed. A pin 34 is provided in dial 25 which indexes in depressions in the fixed bottom dial to retain it in position at any desired film speed to prevent accidental change. The position is changed by lifting the dial to free the pin from the hole and turning it to the desired position, or any other method for yieldingly latching the dial 25 in one adjusted position may be employed. Different types of films have different speeds or sensitivity and, for any one type, the sensitivity is different for different light sources. Ordinary amateur films will have, for example, a film speed number of "12" on the calculator scale for daylight pictures and a number of only "6" when tungsten incandescent lamps are the source of illumination. The corresponding values for panchromatic films are 16 and 12, and the values for superpanchromatic are 24 and 16.

Having set the film speed pointer 29 at its proper value, say "16", two general methods are available for determining the proper exposure. The average brightness of the complete scene may be measured or, if the darkest or the brightest object, in which the detail is desired, can be approached sufficiently closely to make a direct measurement, the brightness of that object may be measured.

If the rear, or photo cell side of the meter, is directed toward, and close to, the darkest object which is to be shown in considerable detail in the picture, a direct reading of its brightness can be obtained. Assume this value to be, for example, 6 candles per square foot. To translate this measured light value into exposure values, the arrows 32, "Darkest object correctly exposed", of the disc 26 is turned to the graduation "6" on the light value scale 28. Appropriate shutter speeds on time scale of dial 25 then appear opposite the several values of diaphragm openings on scale 30. If a shutter speed of $\frac{1}{32}$ is to be used, the alined stop value, $f8$, indicates the smallest diaphragm openings which will give an exposure sufficient for the correct reproduction of detail in the darkest object of the scene. The disc 26 also shows that all objects in the scene having light values up to 700 will be correctly exposed since the arrow 33 is opposite the 700 graduation of the light value scale.

This information is particularly useful as it enables the photographer to select the exposure conditions which are best suited for the particular scene. If the entire scene is comparatively dark, that is without high lights, or if some overexposure of the brightest spots is not objectionable, the exposure may be increased beyond the minimum conditions indicated by the described setting of the computer. For example, if it has been found by direct measurement that the brightest object does not exceed 120 on the light value scale, the operator will know, or can determine by resetting the disc 26, that the exposure may be doubled without danger of exposure of high lights, by increasing the stop opening or decreasing the shutter speed.

For very dark subjects, such as interior views or dark ravines, where the average brightness is very low, it is preferable to measure the brightness of the lightest area that is to appear in detail. If the brightest object in an interior view is a wall having a measured light value of 4 candles per square foot, the "Brightest object" arrow 33 of the disc 26 will be placed opposite the value "4" on the scale 28. The alined stop and time scales will then indicate, for a stop of say $f16$, a 22 second exposure for the reproduction of the light area, and the operator knows that all objects having a brightness down to 1/128 of the brightest object, i. e., down to $\frac{1}{32}$ candle per square foot, will be correctly exposed.

When it is inconvenient or impossible to obtain a direct measurement of the darkest and/or brightest objects, the average value is measured by directing the meter towards the center of the scene. The nature of the scene must then be considered as a factor in determining the exposure period. Scenes of type A, Distant weak contrast, are usually very bright and do not have a great variation in brightness. Among this group are included clouds, direct views of open sea, some snow scenes with few dark objects, and distant landscapes. The other limiting type, C-Dark or Strong contrast, comprises scenes where the general level of light values is low and also subjects containing both very dark and very bright objects. The first class of this type includes scenes in narrow streets or in streets between high buildings, in ravines or under trees with heavy foliage. Examples of the second class of this group are street scenes which consist mostly of important dark buildings built of, say dark granite or brick, and a few very light colored buildings. The majority of subjects will usually be classed at B-Normal, and include well lighted streets, ordinary landscapes, river and beach scenes, portraits in the sun or shade and scenes of objects, including portraits, on ships' decks. In general, scenes may be classed as B-Normal, if they are not readily recognized as falling in group A or group C.

Having determined the average brightness of a scene of one of these groups, the disc 26 is turned to place the particular pointer 31 for that type in alinement with the measured value. Sets of complementary stop and shutter speed values then appear at scales 30 and 25. The arrows 32, 33 indicate the brightness of the darkest and the lightest objects, respectively, that will be correctly exposed when the exposure period is thus determined by the average brightness.

With this definite information, the photographer may vary the exposure in accordance with the nature of the scene, the relative importance of different objects in the scene, and the intended character or style of the picture. The computed data may indicate that it is not possible to obtain a satisfactory reproduction of all objects in the proposed field and, in this event, it may be possible, by moving the camera to another point or by re-arranging the objects, to bring the range of contrast within the effective contrast range of the film.

To facilitate a reading of the calculator in motion picture work, the pointer 29 of the disc 25 is preferably alined with the value of $\frac{1}{32}$ second since that is the shutter speed most commonly used.

Directions for the operation of the exposure meter, a listing of typical scenes falling in groups A, B, C, respectively, and a tabulation of the numerical values of film or plate speeds preferably appear on a chart 35 which is fixed to the front wall of the exposure meter.

Attention is directed to the fact that the numeral values of the brightness scale 28 of the computer correspond (except for the extremely low values) to the block or unit values of the instrument scale 24. This greatly facilitates the computation of exposure data as it is not necessary to attempt an interpolation to obtain the exact magnitude of the light value reading or to set the appropriate scene pointer to an interpolated value on scale 28.

In view of the extremely wide range of light values to be measured, it would be advantageous to employ a measuring instrument having a logarithmic scale or graduations, thus providing high sensitivity at the lower end of a scale having a comparatively high value of illumination at the top of the scale. Although this is not possible when the measuring instrument is a sensitive milliammeter of the usual moving coil type, a fair approximation is obtained by employing a photoelectric cell having a very high resistance for low light intensities and an instrument having a very high resistance movable coil. With this combination, the top light value of the instrument will be comparatively high but the resistance of the cell is so high that the instrument resistance has little effect upon the indications of the instrument at the lower part of the scale. The lower scale ranges are therefore "expanded" and the instrument is highly sensitive to changes in the range of low light intensities. The increased sensitivity at the low end of the scale is obtained, of course, for both ranges of the double range instrument.

The invention provides an exposure meter which may be manipulated rapidly as it is necessary to take but one reading and to set but one dial to aline the stop and time scales in their proper relationship for a particular scene. The range of brightness values which will be properly reproduced by a given set of exposure conditions is indicated by the calculator. It further provides a means for placing the brightness range of a scene (as found by measuring its darkest and brightest objects) at any part of the film range (determined by the exposure range indicated on the calculator lying between the arrows designated "Darkest and brightest objects correctly exposed"), thus giving the photographer not only a correct exposure, but permitting him to choose within reasonable limits, the most desirable average density of the developed film.

All necessary equipment for determining the correct exposure data, on a basis of measured values and established mathematical relationships, is combined in a small and easily handled portable instrument.

While a preferred embodiment of the invention has been illustrated, it will be apparent that the invention is not restricted to the use of any particular number of photoelectric cells, to the shape of the casing herein illustrated, or to a rotary disc type of calculator. Various changes may be made in the several elements, their relative size, shape and relationship without departure from the spirit of the invention as set forth in the following claims.

What I claim is:

1. In an exposure meter, the combination with a casing, and means carried by the casing for measuring the brightness of a scene to be photographed, said means including photosensitive means and a measuring instrument having a scale of brightness graduations exposed to view at one face of the casing, of indicating means mounted on that face of said casing at which said instrument scale is exposed for view, said indicating means including relatively movable elements adapted to be set to correlate the measured brightness of the scene with other exposure factors to determine an appropriate exposure condition for a negative, one of said relatively movable elements having brightness graduations corresponding to those of the instrument scale.

2. A photoelectric exposure meter comprising a relatively flat casing, a photoelectric cell and a measuring instrument having a scale of brightness graduations housed within said casing, openings at opposite faces of said casing for admitting light to said cell and for viewing the scale of said instrument, means for restricting the light rays reaching said cell to those rays which are reflected from an object to be photographed, and a computer comprising relatively adjustable elements mounted on that face of the casing at which the instrument scale is exposed for view, one of said elements having a scale of brightness graduations corresponding to those of the instrument scale.

3. A photoelectric exposure meter comprising an elongated and relatively flat casing having an opening in each of its oppositely disposed flat faces, said openings being displaced from axial alinement, a photoelectric cell within said casing to receive light rays entering through one of said openings, means for restricting the angular spread of the light rays which reach said cell through its associated opening, a measuring instrument having a scale of brightness graduations exposed to view through the second opening, and a computer of the rotary disk type mounted on that face of the casing at which the instrument scale is exposed, the computer being substantially alined with the light-admitting opening of the opposite face and including a disk having brightness graduations corresponding to those of the instrument scale.

4. In an exposure meter, the combination with a casing, and means carried by the casing for measuring the brightness of a scene to be photographed, said means including photosensitive means and a measuring instrument having a scale of brightness graduations, of a computer mounted on said casing and including relatively movable elements adapted to be set in accordance with the measured brightness value and the character of the scene to indicate the corresponding stop and time values for a proper exposure of a film, one of said relatively movable elements having brightness graduations corresponding to those of the instrument scale.

5. In an exposure meter, the combination with a casing housing a photoelectric cell and a measuring instrument having a scale of brightness graduations, of a computer mounted on said casing and comprising a series of relatively movable elements, one of said elements bearing graduations of film or plate speed values and brightness graduations corresponding to those of the instrument scale, a second element adjustable with respect thereto and including a pointer for setting said second element at a position corresponding to the speed of a given film or plate, said second element having graduations corresponding to one of the factors of stop opening or time of exposure, and a third element having indices corresponding to types of scenes for cooperation with the brightness scale of said first element and a scale of the other factor of stop opening or time of exposure for cooperation with the scale of said second element, whereby for a given film or plate speed the proper exposure conditions may be determined by the adjustment of only said third element.

6. In a photoelectric exposure meter, the combination with a photoelectric cell and a measuring instrument having a scale of brightness graduations, of a computer consisting of three relatively movable elements, one element bearing graduations of film or plate speed and brightness graduations corresponding to those of the instrument scale, the second element bearing numeral values of exposure time and carrying a pointer for cooperation with said film or plate speed scale, and the third element being adapted to be set at the brightness value indicated on the instrument scale and having a stop scale cooperating with said time scale, of means for yielding locking said first and second elements in their relative positions corresponding to a given film or plate speed value.

7. In an exposure meter for determining the exposure conditions corresponding to a given type of scene and a brightness value thereof, the combination with photoelectric means for measuring the brightness of a scene, said means including a pointer cooperating with a scale of brightness graduations; of a computer comprising an element carrying numerical graduations corresponding to one of the factors of stop opening or of exposure time, an element having indications corresponding to different types of scenes and a scale graduated in the other factor of stop opening or exposure time, and a third element having graduations of brightness values, corresponding to those of the scale of the photoelectric means, and indices on said second element for indicating the two extremes of the brightness range which will be properly exposed by exposure conditions corresponding to given setting of the selected type of scene indication of the second element into alinement with that brightness graduation of the third element which was indicated by the pointer and scale of the photoelectric means.

8. In an exposure meter, the combination with photoelectric means for measuring the brightness of a scene; said means including a pointer cooperating with a scale of brightness graduations, of a computer comprising a dial bearing indications of exposure time, a second dial having a cooperating scale of stop graduations, a series of brightness values with respect to which said second dial may be adjusted, said series of brightness values consisting of graduations corresponding to those of said scale, indices on said second dial corresponding to different types of scenes, and a pair of indices on said second dial corresponding to the lightest and darkest objects which will be correctly exposed under exposure conditions corresponding to a given setting of said second dial.

9. An exposure meter comprising brightness measuring means having a scale graduated in brightness values, and a computer for evaluating the measured scene brightness with other exposure factors; said computer comprising a scale carrying the same brightness graduations as those of said brightness measuring means, a scale graduated in value of one of the exposure factors of stop openings and time values, an element movable with respect to said scales and having a scale graduated in values of the other exposure factor, and a pair of pointers on said element for cooperation with said brightness scale; said pointers being spaced apart, as measured along any portion of said brightness scale, to include the range of brightness values which, for the indicated exposure, fall within the effective contrast range of a film or plate.

10. The invention as set forth in claim 9, wherein said element is provided with a third pointer corresponding to a given type of scene, said scene pointer being located between and spaced from the respective pointers of said pair by distances, measured along the brightness scale, which bring said pair of pointers into register with the respective brightness values of the lightest and darkest portions of that type of scene which will be correctly exposed under exposure conditions determined by setting the scene pointer at the measured average brightness of the complete scene.

11. In an exposure meter, the combination with an instrument for measuring the brightness value of different objects in a scene which is to be photographed, said instrument having a scale graduated in units of brightness, of a computer comprising a relatively fixed scale of exposure times, and a fixed brightness scale graduated in the same units as said instrument scale, and a movable element having a scale of stop openings for cooperation with said exposure time scale and a pointer corresponding to the darkest object in the scene which is to be photographed.

12. In an exposure meter, the combination with an instrument for measuring the brightness value of different objects in a scene which is to be photographed, said instrument having a scale graduated in units of brightness, of a computer comprising a relatively fixed scale of exposure times, and a fixed brightness scale graduated in the same units as said instrument scale, and a movable element having a scale of stop openings for cooperation with said exposure time scale and a pointer corresponding to the lightest object in the scene which is to be photographed.

13. In an exposure meter, a casing comprising a pair of cooperating sections which each include one of the end walls of the casing, the end wall of the front section having a centrally disposed opening and the end wall of the rear section having two openings symmetrically disposed with respect to and out of alinement with the central opening of the front section, a measuring instrument carried by the front section and having the scale thereof exposed through the said central opening, and a pair of photoelectric devices carried by said front section and in alinement with the said openings in the end wall of the rear section.

WILLIAM NELSON GOODWIN, Jr.